Figure 1:
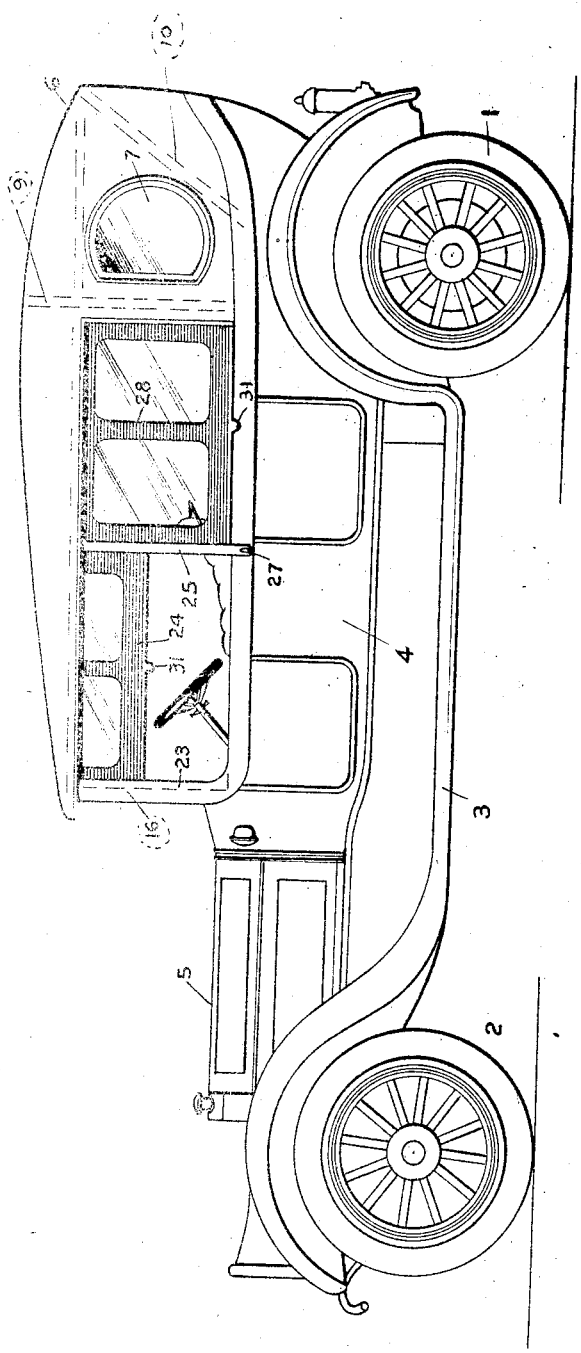

C. & L. GILLIG.
AUTOMOBILE SIDE CURTAIN.
APPLICATION FILED JAN. 17, 1918.

1,294,442.

Patented Feb. 18, 1919.
2 SHEETS—SHEET 1.

INVENTORS
LEO GILLIG
CHESTER GILLIG
BY
Carlos P. Griffin
ATTORNEY.

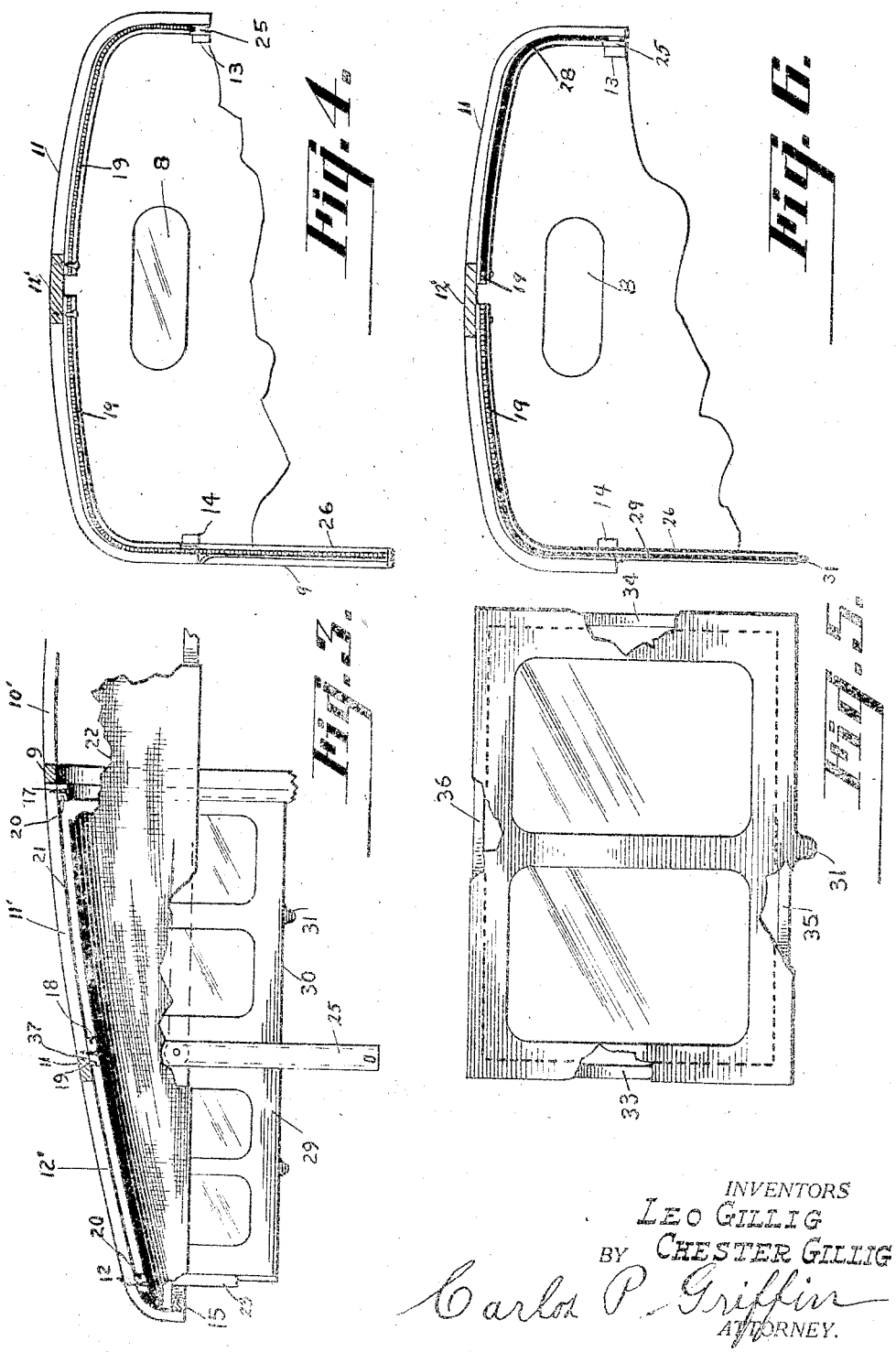

UNITED STATES PATENT OFFICE.

CHESTER GILLIG AND LEO GILLIG, OF SAN FRANCISCO, CALIFORNIA.

AUTOMOBILE SIDE CURTAIN.

1,294,442.  Specification of Letters Patent.  Patented Feb. 18, 1919.

Application filed January 17, 1918. Serial No. 212,191.

*To all whom it may concern:*

Be it known that we, CHESTER GILLIG and LEO GILLIG, citizens of the United States, residing at San Francisco, in the county of San Francisco, State of California, have invented new and useful Automobile Side Curtains, of which the following is a specification in such full and clear terms as will enable those skilled in the art to construct and use the same.

This invention relates to the side curtains of an automobile, and its object is to produce a series of side curtains which may be raised so as to be completely out of sight when not in use, and at the same time to provide means whereby they will be retained in that position without danger of dropping down while the car is running.

Another object of the invention is to provide a guide for the front and back edges of the back and front curtains respectively thereby enabling either of those curtains to be used alone or both at once as may be desired.

Another object of the invention is to provide means whereby the guide for the curtains may be turned up and concealed when not in use.

Other objects of the invention will appear as the description proceeds.

An embodiment of the invention is shown in the drawings in which the same reference numeral is applied to the same portion throughout, but we are aware that there may be modifications thereof.

Figure 2:
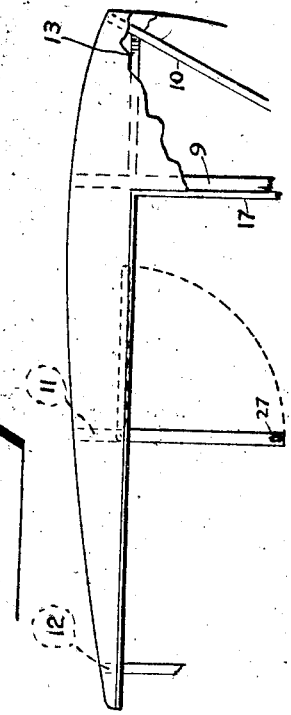

Figure 1 is a side elevation of an automobile having this curtain arrangement applied thereto, Fig. 2 is a side elevation of the automobile top, a portion thereof being broken away for the purpose of illustration showing the curtains raised, Fig. 3 is a sectional view of a portion of the top, the plane of section being parallel to the plane of Fig. 1 for the purpose of showing the curtain guides, Fig. 4 is a transverse sectional view of the top looking toward the rear and showing the center guide for the two curtains raised, Fig. 5 is a plan view of one of the curtains with portions thereof broken away to show the interior construction, and Fig. 6 is a transverse sectional view of the top showing one curtain raised and the other curtain down.

The numerals 1 and 2 represent the wheels of the automobile, 3 the running board, 4 the body, and 5 the hood of the engine.

The top is shown at 6, and it is provided with side windows 7 and with a rear window 8. At the rear, the top has suitable bows 9 and 10 which are secured to the vehicle body in a well known manner, while at the front there are two short bows 11 and 12 with spreaders 10', 11' and 12' connecting the several bows. On each side of the top are two longitudinally extending bars 13 and 14 while at the front an extension of said bars extends transversely as illustrated at 15 for the purpose of forming a small horizontal bow to hold the top just out of contact with the frame 16 of the wind shield and to which the top is connected in any suitable manner. Just under the bows 9, 11 and 12, and with their ends secured to the spreaders and bows, there are four guides 17, 18, 19 and 20. These guides are curved at the sides to correspond with the bows, and since there is a fabric 21 outside, and a fabric lining 22 inside the guides, they are completely concealed from view, except at the narrow opening between the two fabrics at the sides of the top. The wind shield frame has a guide 23 for the front edge of the curtain 24, and the bow 11 has two double guides 25, 26 pivotally connected to its ends, each of said guides being connected with the body by means of a curtain holder 27 when in use, and being capable of being turned up to the dotted line position shown in Fig. 2 and concealed between the two plies of fabric of which the top is formed when not in use.

The guides 25, 26 have grooves in the opposite edges, one to receive the front curtain and the other to receive the back curtain. The guide 17 extends down the side of the bow 9 to the top of the body of the machine. The curtains, of which there are four, are indicated at 24, 28, 29 and 30, and each curtain is provided with two windows as illustrated. Each curtain is also provided with a tab 31 for the purpose of operating it, and the curtains are all made of a double layer of suitable flexible cloth or leather upon a framework consisting of two vertically extending clock spring steel members 33, 34, which are secured at their ends to two transversely extending stiff flat plates 35, 36, so that the curtain has considerable stiffness from end to end, but is readily bent around the corner formed by the bows as the curtain is raised or lowered. Owing to the shape of the top it is frequently necessary to space the guides away from the bow as illustrated at 37 in order to have the curtain properly fit the guides, but such spacing depends of course entirely upon the shape of the particular top to which the guides are to be applied.

In operation, the curtain may be raised or lowered by simply pulling the guides 25, 26 down and connecting them with the top of the body by means of the curtain catches 27. When the guides 25, 26 have been secured, the curtains may be all pulled down at the desire of the occupant of the machine, without having to stop the machine or get out of the seat.

Having thus described our invention what we claim as new and desire to secure by Letters Patent of the United States is as follows, express reservation being made of permissible modifications:

1. A disappearing curtain for automobiles comprising an automobile top, bows carried thereby and supporting a series of guideways, the guideways lying below the plane of the bows in their upper portion and in the plane of the bows at the lower portions thereof, two sets of flexible curtains slidable in the guideways at opposite sides thereof, and a bar pivotally connected at one end with the top structure and having guideways in opposite edges thereof and adapted to lie concealed under the top when not in use, and means to detachably connect the lower end of said bar to the body of the automobile.

2. A disappearing curtain for automobiles comprising an automobile top, bows therefor, a longitudinally extending member connecting the central portions of the bows, guides secured to said longitudinally extending member thereunder and extending into the plane of the lower portions of the bows, a curtain slidable in the guides, and a pivoted guide adapted to be detachably secured to the automobile at its lower end or to be turned up and concealed in the lower edge of the top when not in use.

3. A disappearing curtain for automobiles comprising a top having bows, a longitudinal sectional member having sections between and connecting the bows at their center and flush therewith, guides supported by said bows the upper portions of the guides being below the plane of the upper portion of the bows, two flexible curtains in the guides to stand in a vertical position at the side of the top or to lie concealed thereunder, and a double groove guide adopted to receive the adjacent edges of both curtains detachably connected with the body in which the curtains slide when down.

4. A disappearing curtain for automobiles comprising an automobile top, bows carried thereby and supporting a series of guideways, the guideways lying below the plane of the bows in their upper portion and in the plane of the bows at the lower portions thereof, two sets of flexible curtains slidable in the guideways at opposite sides thereof, and a bar connected to the automobile body having guideways in opposite edges thereof.

5. A disappearing curtain for automobiles comprising an automobile top, bows carried thereby and supporting a series of guideways, the guideways lying below the plane of the bows in their upper portion and in the plane of the bows at the lower portions thereof, two sets of flexible curtains slidable in the guideways at opposite sides thereof, and a bar detachably connected to the automobile body having guideways in opposite edges thereof.

In testimony whereof we have hereunto set our hands this 8th day of January A. D., 1918.

CHESTER GILLIG.
LEO GILLIG.